(12) United States Patent
Li

(10) Patent No.: US 11,675,227 B2
(45) Date of Patent: Jun. 13, 2023

(54) METAL WIRE GRID POLARIZER AND MANUFACTURING METHOD THEREOF, DISPLAY DEVICE

(71) Applicant: BOE Technology Group Co., Ltd., Beijing (CN)

(72) Inventor: Haixu Li, Beijing (CN)

(73) Assignee: BOE Technology Group Co., Ltd., Beijing (CN)

( * ) Notice: Subject to any disclaimer, the term of this patent is extended or adjusted under 35 U.S.C. 154(b) by 149 days.

(21) Appl. No.: 17/260,911

(22) PCT Filed: Mar. 20, 2020

(86) PCT No.: PCT/CN2020/080475
§ 371 (c)(1),
(2) Date: Jan. 15, 2021

(87) PCT Pub. No.: WO2021/184370
PCT Pub. Date: Sep. 23, 2021

(65) Prior Publication Data
US 2022/0137456 A1 May 5, 2022

(51) Int. Cl.
*G02F 1/1335* (2006.01)
*G02F 1/1347* (2006.01)
(52) U.S. Cl.
CPC ...... *G02F 1/133548* (2021.01); *G02F 1/1347* (2013.01); *G02F 1/133514* (2013.01)
(58) Field of Classification Search
CPC .............................................. G02F 1/133548
See application file for complete search history.

(56) References Cited

U.S. PATENT DOCUMENTS

| 9,817,266 B2 | 11/2017 | Tang |
| 9,990,065 B2 | 6/2018 | Wang |
| 2009/0109369 A1 | 4/2009 | Morishita |

(Continued)

FOREIGN PATENT DOCUMENTS

| CN | 104102383 A | 10/2014 |
| CN | 105242342 A | 1/2016 |

(Continued)

OTHER PUBLICATIONS

International Search Report issued in PCT/CN2020/080475 dated Dec. 23, 2020, (9p).

(Continued)

*Primary Examiner* — Edmond C Lau
(74) *Attorney, Agent, or Firm* — Arch & Lake LLP

(57) ABSTRACT

The embodiments of the present disclosure relate to the field of display technologies, in particular to a metal wire grid polarizer and a manufacturing method thereof, and a display device. The metal wire grid polarizer includes a base substrate and a plurality of metal wire grids. The base substrate has a plurality of binding areas and a plurality of binding contraposition areas. The metal wire grids are disposed on the base substrate and arranged parallel to each other, and orthographic projections of the metal wire grids on the base substrate do not overlap with the binding areas or the binding contraposition areas, to avoid the metal wire grids from shielding light in the binding process, ensure the alignment process to proceed smoothly, and realize the binding accuracy.

7 Claims, 4 Drawing Sheets

(56) References Cited

U.S. PATENT DOCUMENTS

| | | |
|---|---|---|
| 2016/0252987 A1 | 9/2016 | Wang |
| 2017/0131593 A1 | 5/2017 | Tang |
| 2018/0081225 A1* | 3/2018 | Lee ................... G02F 1/133528 |
| 2021/0333580 A1* | 10/2021 | Matsushima ....... G02F 1/13471 |

FOREIGN PATENT DOCUMENTS

| | | |
|---|---|---|
| CN | 105892177 A | 8/2016 |
| CN | 110646969 A | 1/2020 |
| CN | 105892177 B | 4/2020 |
| JP | 2009109562 A | 5/2009 |

OTHER PUBLICATIONS

Written Opinion of International Application No. PCT/CN2020/080475 dated Dec. 23, 2020, (2p).

\* cited by examiner

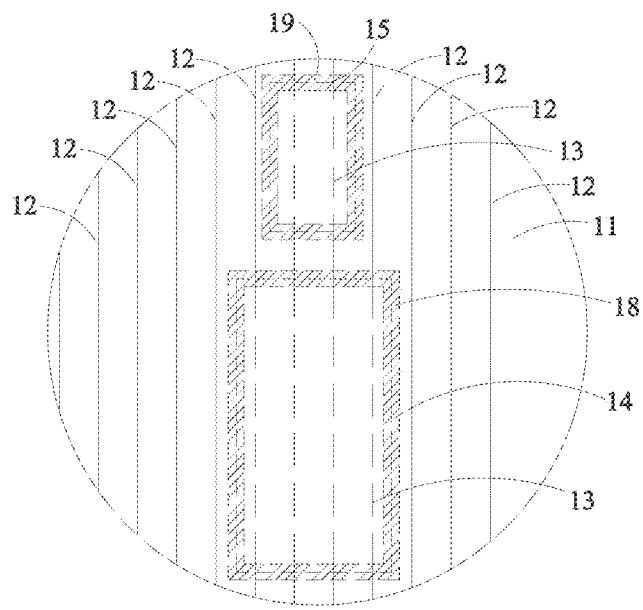
FIG. 2
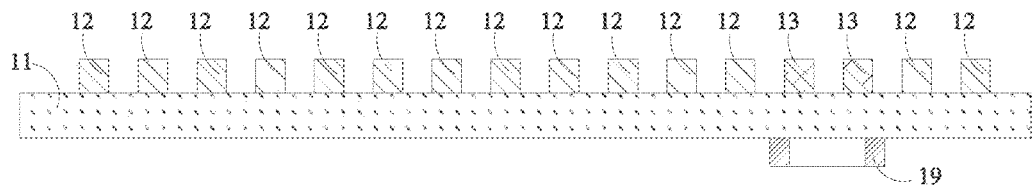
FIG. 3
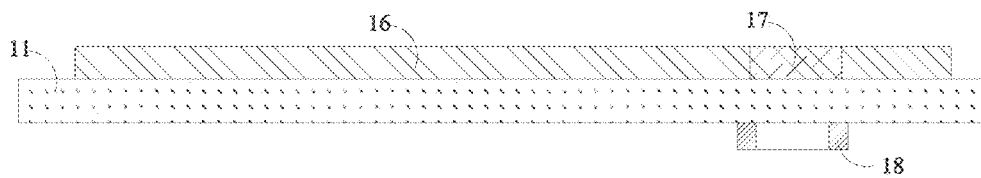
FIG. 4
FIG. 5

METAL WIRE GRID POLARIZER AND MANUFACTURING METHOD THEREOF, DISPLAY DEVICE

CROSS-REFERENCE TO RELATED APPLICATIONS

This application is the national phase application under 35 U.S.C. § 371 of International Patent Application No. PCT/CN2020/080475, filed on Mar. 20, 2020, the entire contents of which are incorporated herein by reference as a part of this application.

TECHNICAL FIELD

The embodiments of the present disclosure relate to the field of display technologies, in particular to a metal wire grid polarizer and a manufacturing method thereof, and a display device comprising the metal wire grid polarizer.

BACKGROUND

In our daily lift, there is no larger screen device than TV products, and with change of consumers' consumption concepts, the TV products have gradually developed to possess intelligence and large screens. For many consumers, 55-inch TVs may be standard; however, more and more manufacturers have started to introduce 65-inch or even 75-inch or 80-inch large-screen TVs, so that it is predicted to increasingly enlarge of the screen areas of the TVs. As the production capacity of large-size LCD screens is constantly increasing, the market becomes more competitive.

At present, when the circuit board and the flexible printed circuit board are bound to the display substrate or the optical control substrate, because of a metal wire grid polarizer provided on the back of the display substrate or the optical control substrate, an alignment process cannot be performed, and thus it is difficult to achieve the binding accuracy.

SUMMARY

Embodiments of the present disclosure provide a metal wire grid polarizer, a manufacturing method of a metal wire grid polarizer, and a display device including the metal wire grid polarizer, which can realize the binding accuracy.

In an embodiment of the present disclosure, a metal wire grid polarizer is provided. The metal wire grid polarizer includes:

a base substrate having binding areas and binding contraposition areas;

metal wire grids disposed on the base substrate and arranged parallel to each other, orthographic projections of the metal wire grids on the base substrate do not overlap with the binding areas or the binding contraposition areas.

In an embodiment of the present disclosure, the metal wire grid, the orthographic projection of which extending to the binding area and the binding contraposition area, comprises at least two sub-metal wire grids spaced apart, and the metal wire grid polarizer further includes:

transparent wire grids disposed on the same surface of the base substrate with the metal wire grids, and arranged parallel to the metal wire grids, two ends of at least one of the transparent wire grids being respectively connected to two of the sub-metal wire grids on the same straight line.

In an embodiment of the present disclosure, the metal wire grid polarizer further includes:

first shielding portions at a light exit side of the metal wire grid, an edge of the binding area being within an orthographic projection of the first shielding portion on the base substrate;

second shielding portions at the light exit side of the metal wire grid, and an edge of the binding contraposition area being within an orthographic projection of the second shielding portion on the base substrate.

In an embodiment of the present disclosure, the metal wire grid is an aluminum wire grid, and the transparent wire grid is a transparent resin wire grid.

In an embodiment of the present disclosure, a manufacturing method of a metal wire grid polarizer is provided. The manufacturing method includes:

providing a base substrate having binding areas and binding contraposition areas;

forming metal wire grids on the base substrate, the metal wire grids being arranged parallel to each other, and orthographic projections of the metal wire grids on the base substrate do not overlap with the binding areas or the binding contraposition areas.

In an embodiment of the present disclosure, forming metal wire grids on the base substrate includes:

forming a metal layer on the base substrate;

patterning the metal layer to remove a part of the metal layer, so that an orthographic projection of a remaining part of the metal layer on the base substrate does not overlap with the binding areas or the binding contraposition areas;

further patterning the metal layer to form the metal wire grids.

In an embodiment of the present disclosure, after removing a part of the metal layer, the manufacturing method further includes:

forming a transparent resin layer in a via hole formed by removing the metal layer on the base substrate, a thickness of the transparent resin layer being the same as that of the metal layer;

patterning the transparent resin layer to form transparent wire grids while patterning further the metal layer to form the metal wire grids In an embodiment of the present disclosure, forming metal wire grids on the base substrate includes:

forming a metal layer on the base substrate;

forming a protective layer at a side of the metal layer facing away from the base substrate;

patterning the metal layer and the protective layer to remove a part of the metal layer and a part of the protective layer, so that orthographic projections of the remaining metal layer and the remaining protective layer on the base substrate do not overlap with the binding areas or the binding contraposition areas;

patterning the metal layer and the protective layer again to form the metal wire grids.

In an embodiment of the present disclosure, after removing a part of the metal layer and a part of the protective layer, the manufacturing method further includes:

forming a transparent resin layer in a via hole formed by removing the metal layer and the protective layer on the base substrate, a thickness of the transparent resin layer being the same as a sum of thicknesses of the metal layer and the protective layer;

patterning the transparent resin layer to form transparent wire grids while further patterning the metal layer and the protective layer to form the metal wire grids.

In an embodiment of the present disclosure, forming the metal wire grids on the base substrate includes:

forming a metal layer on the base substrate;

patterning the metal layer to form metal wire grids;

patterning the metal wire grids to remove some segments of some of the metal wire grids, so that orthographic projections of the remaining ones of the metal wire grids on the base substrate do not overlap with the binding areas or the binding contraposition areas.

In an embodiment of the present disclosure, the manufacturing method further includes:

forming a first shielding portion and a second shielding portion at a light exit side of the metal wire grid, an edge of the binding area being within an orthographic projection of the first shielding portion on the base substrate, and an edge of the binding contraposition area being within an orthographic projection of the second shielding portion on the base substrate.

In an embodiment of the present disclosure, a display device is provided. The display device includes:

a display panel including the metal wire grid polarizer described above;

an optical control panel including the metal wire grid polarizer described above;

the display panel being at a light exit side of the optical control panel.

In an embodiment of the present disclosure, the display panel further includes:

a first array substrate at a side of the base substrate facing away from the metal wire grids, or a side of the metal wire grids facing away from the base substrate;

a first liquid crystal layer at a side of the first array substrate facing away from the base substrate;

a color film substrate at a side of the first liquid crystal layer facing away from the array substrate.

In an embodiment of the present disclosure, the optical control panel further includes:

a second array substrate disposed at a side of the base substrate facing away from the metal wire grids or a side of the metal wire grids facing away from the base substrate;

a second liquid crystal layer disposed at a side of the second array substrate facing away from the base substrate.

In an embodiment of the present disclosure, binding areas and binding contraposition areas of the display panel, and binding areas and binding contraposition areas of the optical control panel are located at opposite sides of the display device.

BRIEF DESCRIPTION OF THE DRAWINGS

The accompanying drawings are intended to provide a further understanding of the embodiments of the present disclosure and constitute a part of the specification, and together with the embodiments of the present disclosure, serve to explain the present disclosure, and do not constitute a limitation to the disclosure. The above-described and other features and advantages of the present disclosure will become more apparent from the detailed descriptions of exemplary embodiments with reference with the accompanying drawings.

FIG. 2 is a schematic partial enlargement view of a part indicated by H in FIG. 1;

FIG. 3 is a schematic sectional view taken along line I-I in FIG. 1;

FIG. 4 is a schematic flow block diagram of an exemplary embodiment of a manufacturing method of a metal wire grid polarizer of the present disclosure;

FIG. 5 is a cross-sectional view after forming a transparent resin layer on a base substrate;

Figure 1:
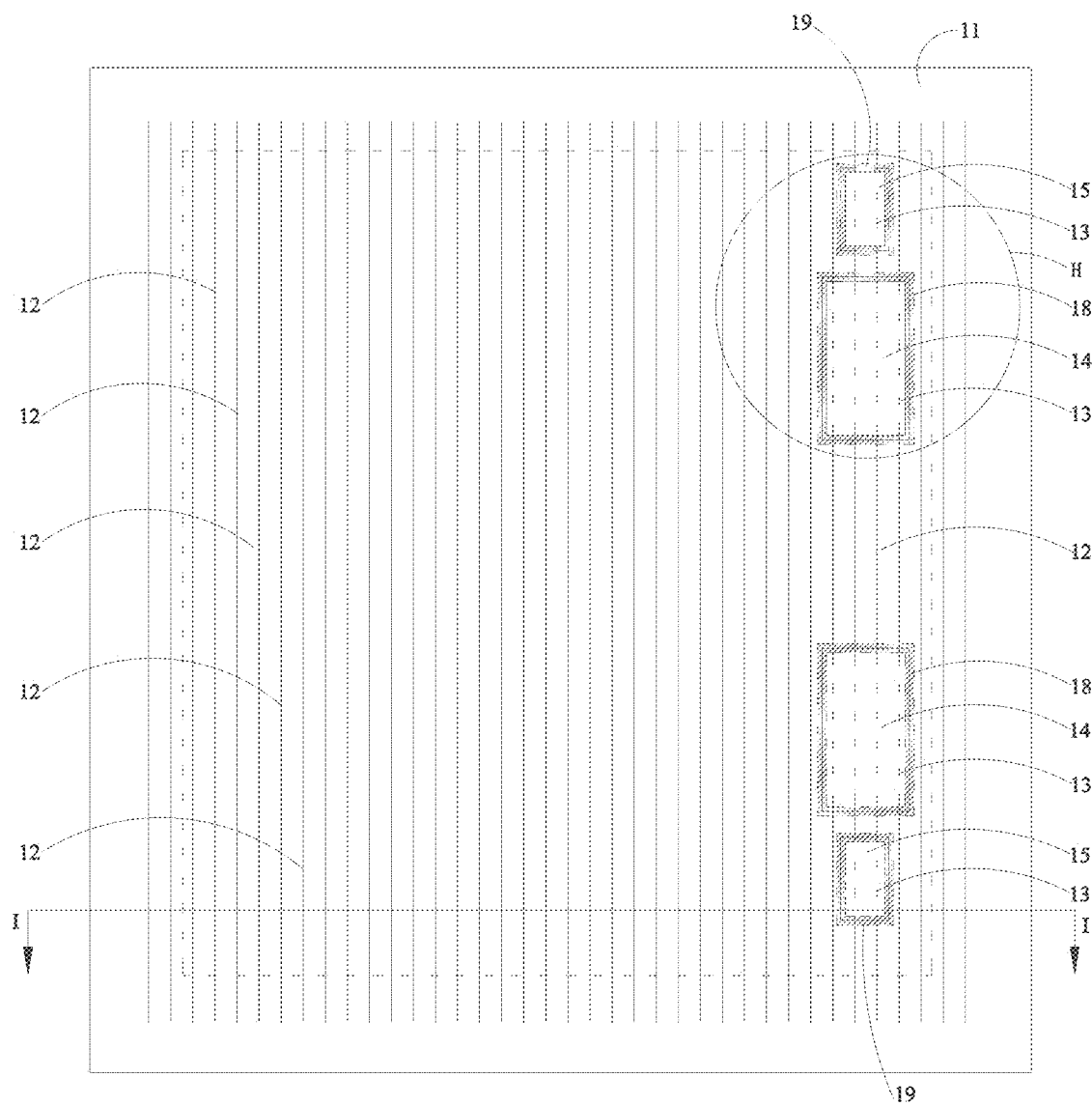
FIG. 1 is a structural schematic view of an exemplary embodiment of a metal wire grid polarizer of the present disclosure.

The reference numbers of main elements in the drawings are described as follows:

1. metal wire grid polarizer; 11. base substrate; 12. metal wire grid; 13. transparent wire grid; 14. binding area; 15. binding contraposition area; 16. metal layer; 17. transparent resin layer; 18. first shielding portion; 19. second shielding portion; 2. display panel; 21. first array substrate; 22. first liquid crystal layer; 23. color film substrate; 3. optical control panel; 31. second array substrate; 32. second liquid crystal layer.

DETAILED DESCRIPTION

Now, the exemplary embodiments will be described more fully with reference to the accompanying drawings. However, the exemplary embodiments can be embodied in a variety of forms and should not be construed as limiting the embodiments set forth herein. Instead, these embodiments are provided so that the present disclosure will be thorough and complete, and the concepts of the exemplary embodiments will be fully given to those skilled in the art. The same reference numerals in the drawings denote the same or similar structures, and thus their detailed descriptions will be omitted.

Although relative terms such as "above" and "under" are used herein to describe the relationship of one component relative to another component, such terms are used herein only for the sake of convenience, for example, in the direction shown in the figure, it should be understood that if the referenced device is inversed upside down, a component described as "above" will become a component described as "under". When a structure is described as "above" another structure, it probably means that the structure is integrally formed on another structure, or, the structure is "directly" disposed on another structure, or, the structure is "indirectly" disposed on another structure through an additional structure.

The terms "a", "an", "the", "said" and "at least one", are used to express the presence of one or more the element/constitute/or the like. The terms "comprise", "include" and "have" are intended to be inclusive, and mean there may be additional elements/constituents/or the like other than the listed elements/constituents/or the like. The "first" and "second" are used only as marks, and are not numerical restriction to the objects.

First, the present disclosure provides a metal wire grid polarizer. Referring to the schematic structural views of an exemplary embodiment of the metal wire grid polarizer of the present disclosure shown in FIGS. 1, 2 and 3, the metal wire grid polarizer 1 may include a base substrate 11, a plurality of metal wire grids 12 and a plurality of transparent wire grids 13. The base substrate 11 has a plurality of binding areas 14 and a plurality of binding contraposition areas 15. The metal wire grids 12 are disposed on the base substrate 11 and disposed parallel to each other, and orthographic projections of the metal wire grids 12 on the base substrate 11 do not overlap with the binding areas 14 and the binding contraposition areas 15.

In this exemplary embodiment, the orthographic projections of the metal wire grids 12 on the base substrate 11 may be orthographic projections of the metal wire grids 12 on a plane on which the binding areas 14 and the binding contraposition areas 15 of the base substrate 11 are positioned.

The orthographic projections of the metal wire grids 12 on base substrate 11 do not overlap with the binding areas 14 and the binding contraposition areas 15, thereby avoiding the metal wire grids 12 from shielding light in the binding process, enabling the alignment process to proceed smoothly and realizing the binding accuracy.

In this exemplary embodiment, the base substrate 11 may be a glass substrate. The base substrate 11 has a display area and a non-display area, and the non-display area is provided with two binding areas 14 and two binding contraposition areas 15. The two binding areas 14 are located between the two binding contraposition areas 15, and areas of the two binding areas 14 are larger than those of the two binding contraposition areas 15. The binding area 14 is configured to bind with the circuit board or the flexible printed circuit board, and the binding contraposition area 15 is configured to set an alignment mark. Of course, in other exemplary embodiments of the present disclosure, the base substrate 11 may be a flexible substrate. The number and the size of the binding areas 14 and the binding contraposition areas 15 may be provided as required.

In this exemplary embodiment, a plurality of metal wire grids 12 are disposed at a side of the base substrate 11 opposite to the binding areas 14 and the binding contraposition areas 15, and a width of the metal wire grid 12 is a nanoscale, and a length of the metal wire grid 12 is macroscopic magnitude, which can polarize light. The metal wire grid 12 may be an aluminum wire grid. That is to say, the metal wire grids 12, and the binding areas 14 and the binding contraposition areas 15 are disposed on both sides (opposite sides) of the base substrate 11. The orthographic projections of the metal wire grids 12 on the base substrate 11 do not overlap with the binding areas 14 and the binding contraposition areas 15, that is, the orthographic projections of the metal wire grids 12 on the base substrate 11 are not within the binding areas 14 and the binding contraposition areas 15, the metal wire grid 12 extending the orthographic projection to the binding areas 14 and the binding contraposition areas 15 is interrupted to form two sub-metal wire grids, three sub-metal wire grids, four sub-metal wire grids or more sub-metal wire grids.

In this exemplary embodiment, a plurality of transparent wire grids 13 are also provided at the same side of the base substrate 11 on which the metal wire grids 11 are disposed. The transparent wire grids 13 are disposed parallel to the metal wire grids 11, and both ends of the transparent wire grid 13 are connected between two sub-metal wire grids on the same straight line, that is, the transparent wire grid 13 reconnects the interrupted sub-metal wire grids on the same line to form a wire grid. The transparent wire grid 13 may be a transparent resin wire grid. It should be noted that when two parts of one metal wire grid 12 are interrupted to form three sub-metal wire grids, the three sub-metal wire grids are connected by two transparent wire grids 13 to form one wire grid. In the same way, when three parts of one metal wire grid are interrupted, they are connected by the three transparent wire grids 13. The transparent wire grid 13 does not affect the light transmittance, and avoids the lodging and missing of the metal wire grid 12.

In addition, in other exemplary embodiments of the present disclosure, the metal wire grids 12, the binding areas 14 and the binding contraposition areas 15 may be disposed on the same plane. In this case, the metal wire grid 12 is not provided in the binding areas 14 or the binding contraposition areas 15; alternatively, a plurality of transparent wire grids 13 may also be provided in the binding areas 14 and the binding contraposition areas 15. Both ends of the transparent wire grid 13 are connected with two sub-metal wire grids on the same line.

In this exemplary embodiment, the metal wire grid polarizer may further include a plurality of first shielding portions 18 and a plurality of second shielding portions 19, and the number of the first shielding portions 18 is equal to that of the binding areas 14. The number of the second shielding portions 19 is equal to that of the binding contraposition areas 15, so that an edge of each binding area 14 is shielded by a first shielding portion 18, and an edge of each binding contraposition area 15 is also shielded by a second shielding portion 19. The first shielding portion 18 and the second shielding portion 19 may be disposed at a side of the base substrate 11 facing away from the metal wire grids 12, that is, the first shielding portion 18 and the second shielding portion 19, and the metal wire grids 12 are disposed at both sides (opposite sides) of the base substrate 11. Each of the first shielding portion 18 and the second shielding portion 19 is provided in a ring shape. The edge of the binding area 14 lies in the orthographic projection of the first shielding portion 18 on the base substrate 11, and the edge of the binding contraposition area 15 lies in the orthographic projection of the second shielding portion 19 on the base substrate 11. The edge of the binding area 14 may lie in a middle position in a width direction of the orthographic projection of the first shielding portion 18 on the base substrate 11, and the edge of the binding contraposition area 15 may lie in a middle portion of a width direction of the orthographic projection of the second shielding portion 19 on the base substrate 11. The width of the first shielding portion 18 or the second shielding portion 19 is about 5 microns. The uneven light caused by the abnormality of the metal wire grid 12 can be avoided by shielding the abnormality caused by removing the metal wire grids 12 at the edges of the binding area 14 and the binding contraposition area 15 by the first shielding portion 18 and the second shielding portion 19.

Of course, it should be noted that when the metal wire grid 12, the binding area 14 and the binding contraposition area 15 are disposed on the same side of the base substrate 11, the first shielding portion 18 and the second shielding portion 19 may also be disposed at a side of the metal wire grid 12 facing away from the base substrate 11. When the metal wire grid 12, and the binding area 14 and the binding contraposition area 15 are disposed at both sides (opposite sides) of the base substrate 11, the first shielding portion 18 and the second shielding portion 19 may be disposed between the metal wire grid 12 and the base substrate 11. In a word, as long as the first shielding portion 18 and the second shielding portion 19 are disposed at the light exit side of the metal wire grid 12, the uneven light caused by the abnormality of the metal wire grid 12 can be avoided by shielding the abnormality caused by removing the metal wire grids 11 at the edge of the binding area 14 and the binding contraposition area 15.

Further, the present disclosure also provides a manufacturing method of a metal wire grid polarizer, referring to a schematic flow block diagram of an exemplary embodiment of the manufacturing method of the metal wire grid polarizer shown in FIG. 4. The manufacturing method of the metal wire grid polarizer may include following steps:

S10, providing a base substrate 11 having a plurality of binding areas 14 and a plurality of binding contraposition areas 15.

S20, forming a plurality of metal wire grids 12 on the base substrate 11, in which the metal wire grids 12 are disposed parallel to each other, and orthographic projections of the metal wire grids 12 on the base substrate 11 do not overlap with the binding areas 14 and the binding contraposition areas 15.

The detailed description of the steps of the manufacturing method of the metal wire grid polarizer will be described below.

S10, providing a base substrate 11 having a plurality of binding areas 14 and a plurality of binding contraposition areas 15.

In this exemplary embodiment, a base substrate 11 is provided. The base substrate 11 is provided with a display area and a non-display area located around the display area, and two binding areas 14 and two binding contraposition areas 15 are provided in the non-display area.

S20, forming a plurality of metal wire grids 12 on the base substrate 11, in which the metal wire grids 12 are arranged parallel to each other, and orthographic projections of the metal wire grids 12 on the base substrate 11 do not overlap with the binding areas 14 and the binding contraposition areas 15.

In this exemplary embodiment, a metal layer 16 is formed at a side of the base substrate 11 opposite to the binding areas 14 and the binding contraposition areas 15 by deposition, sputtering, evaporation or the like. The metal layer 16 is an aluminum layer with a thickness of about 200 nm. Then, photolithography is performed on the metal layer 16 to remove a part of the metal layer 16, so that the orthographic projection of the remaining metal layer on the base substrate 11 does not overlap with the binding areas 14 and the binding contraposition areas 15, to avoid the metal wire grids 12 from shielding light in the subsequent binding process, and enable the alignment process to proceed smoothly and realize the binding accuracy.

Of course, in other exemplary embodiments of the present disclosure, the metal layer 16 may be formed at a side of the base substrate 11 at which the binding areas 14 and the binding contraposition areas 15 are disposed, and then the metal layer 16 is performed by photolithography to remove a part of the metal layer 16, so that the orthographic projection of the remaining metal layer on the base substrate 11 does not overlap with the binding areas 14 and the binding contraposition areas 15, to avoid the metal wire grids 12 from shielding light in the subsequent binding process, enable the alignment process to proceed smoothly and realize the binding accuracy.

After removing a part of the metal layer, as shown in FIG. 5, a transparent resin layer 17 is formed at a side of the base substrate 11 where the metal layer is formed, and the transparent resin layer 17 is only filled in the via hole formed after removing the part of the metal layer 16. A thickness of the transparent resin layer 17 is the same as that of the metal layer 16, and is about 200 nm. The transparent resin layer 17 has a certain rigidity and can withstand a temperature of about 150° C. in the subsequent process.

Figure 6:
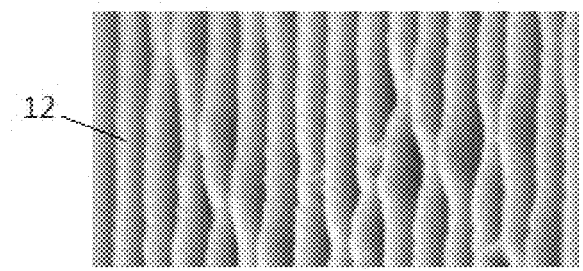
FIG. 6 is a schematic microstructure view of a metal wire grid formed without transparent resin layer filled.
Figure 7:
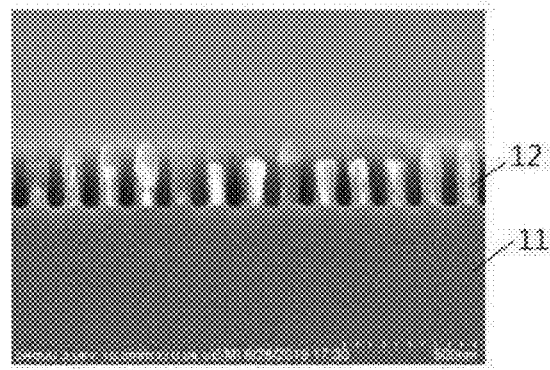
FIG. 7 is a schematic sectional view of FIG. 6.
Figure 8:
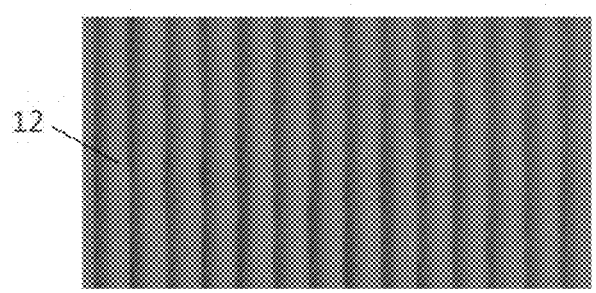
FIG. 8 is a schematic microstructure diagram of metal wire grid formed after filling transparent resin layer.
Figure 9:
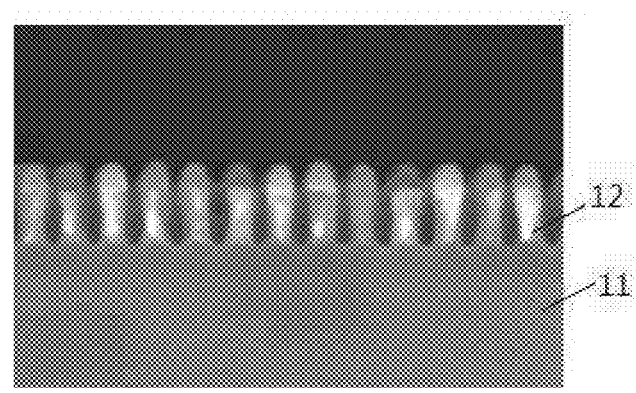
FIG. 9 is a schematic sectional view of FIG. 8.

There is a segment difference between the metal layer 16 on the base substrate 11 and the base substrate 11 after removing the metal layer. Due to fine nano-imprint lithography process conditions, slight segment differences may lead to line defects in a large area around the edges, and finally lead to the lodging and missing of the metal wire grids 12. With reference to schematic microstructure views of the metal wire grid formed when the transparent resin layer is not filled as shown in FIG. 6 and FIG. 7, it can be seen from the figures that the metal wire grid 12 is seriously lodging and missing. Filling the transparent resin layer 17 cannot affect the light transmittance, and provide a better base for nano-imprint lithography to avoid the lodging and missing of the metal wire grid 12 in the subsequent process. Referring to schematic microstructure view of the metal wire grid formed after filling the transparent resin layer shown in FIG. 8 and FIG. 9, it can be seen that the metal wire grid 12 is neither lodging nor missing.

A "Hard Mask" is deposited on the metal layer 16 and the transparent resin layer 17, and is an inorganic thin film material produced by CVD (Chemical Vapor Deposition). The main composition of the hard mask are usually TiN, SiN, SiO2, and the like. A layer of imprinting adhesive is formed on the "Hard Mask", and is imprinted and cured by using a soft template to form a plurality of strip grooves arranged parallel to each other on the imprinting adhesive; the "Hard Mark" uncovered by the imprinting adhesive is performed by dry etching to remove the "Hard Mask" layer uncovered by the imprinting adhesive, so as to form a "Hard Mask" mask; the metal layer 16 and the transparent resin layer 17 that are not covered by the "Hard Mask" mask are etched, so that the metal layer 16 forms a plurality of metal wire grids 12, and the transparent resin layer 17 forms transparent wire grids 13.

The metal wire grids 12 may also be formed by the following methods.

At a side of the base substrate 11 opposite to the binding areas 14 and the binding contraposition areas 15, a metal layer 16 is formed by deposition, sputtering, evaporation, or the like, and the metal layer 16 is an aluminum layer with a thickness of about 200 nm.

At a side of the metal layer 16 facing away from the base substrate 11, a protective layer has a thickness of about 100 nm. The protective layer may be a silicon oxide layer, a silicon nitride layer, and the like.

The metal layer 16 and the protective layer are photoetched to remove a part of the metal layer 16 and a part of the protective layer, so that orthographic projections of the remaining metal layer 16 and the remaining protective layer on the base substrate 11 do not overlap with the binding areas 14 and the binding contraposition areas 15, to avoid the metal wire grids 12 from shielding light in the subsequent binding process, enable the alignment process to proceed smoothly and realize the binding accuracy.

Of course, in other exemplary embodiments of the present disclosure, the metal layer 16 may be formed at a surface of the base substrate 11 where the binding areas 14 and the binding contraposition areas 15 are arranged. A protective layer is formed at a surface of the metal layer 16 facing away from the base substrate 11, and the metal layer 16 and the protective layer are photoetched to remove a part of the metal layer 16 and a part of the protective layer, so that orthographic projections of the remaining metal layer 16 and the remaining protective layer on the base substrate 11 do not overlap with the binding areas 14 and the binding contraposition areas 15, to avoid the metal wire grids 12 from shielding light in the subsequent binding process, enable the alignment process to proceed smoothly and realize the binding accuracy.

After removing the part of the metal layer, a transparent resin layer 17 is formed at a surface of the base substrate 11 where the metal layer is formed, and the transparent resin layer 17 is only filled in the via hole formed after removing the part of the metal layer 16 and the part of the protective layer. A thickness of the transparent resin layer 17 is the same as a sum of the thickness of the metal layer 16 and the thickness of the protective layer, and is about 300 nm. The transparent resin layer 17 has a certain rigidity and can withstand a temperature of about 150° C. in the subsequent process.

There would also be a segment difference between the protective layer on the base substrate and the base substrate after removing the metal layer 16 and the protective layer. Due to fine nano-imprint lithography process conditions, slight segment differences may lead to line defects in a large area around the edges, and finally lead to the lodging and missing of the metal wire grids 12. The transparent resin layer 17 may provide a relatively flat base for nano-imprinting process after the transparent resin layer is filled, so that lodging and missing of the subsequently formed metal wire grids 12 can be avoided.

After the transparent resin layer 17 is formed, a layer of imprinting adhesive is imprinted on the protective layer and the transparent resin layer 17, and is imprinted and cured by using a soft template, to form a plurality of strip grooves arranged parallel to each other on the imprinting adhesive; the protective layer uncovered by the imprinting adhesive is performed by dry etching to remove the protective layer uncovered by the imprinting adhesive so as to form a protective layer mask; the metal layer 16 and the transparent resin layer 17 that are not covered by the protective layer mask are etched, so that the metal layer 16 forms a plurality of metal wire grids 12, and the transparent resin layer 17 forms transparent wire grids 13.

The metal wire grids 12 may also be formed by the following methods.

At a side of the base substrate 11 opposite to the binding areas 14 and the binding contraposition areas 15, a metal layer 16 is formed by deposition, sputtering, evaporation, or the like, and the metal layer 16 is an aluminum layer with a thickness of about 200 nm. A $SiO_2$ layer is manufactured on the metal layer 16; a thickness of the $SiO_2$ layer is about 100 nm. A layer of imprinting adhesive is formed on the $SiO_2$ layer; the imprinting adhesive is imprinted and cured by using a soft template, so that a plurality of strip grooves arranged parallel to each other are formed on the imprinting adhesive; the $SiO_2$ layer uncovered by the imprinting adhesive is performed by dry etching to remove the $SiO_2$ layer uncovered by the imprinting adhesive, so as to form a $SiO_2$ mask; the metal layer 16 uncovered by the $SiO_2$ mask is etched to form a plurality of metal wire grids 12, and then the $SiO_2$ mask may be removed.

The metal wire grids 12 are patterned to remove some segments of the metal wire grids 12, so that orthographic projections of the remaining ones of the metal wire grids 12 on the base substrate 11 do not overlap with the binding areas 14 and the binding contraposition areas 15. The patterning may be dry etching, photolithography, or the like. Thus, the shielding of light by the metal wire grid 12 in the subsequent binding process can be avoided to ensure the alignment process to proceed smoothly and realize the binding accuracy.

Of course, in other exemplary embodiments of the present disclosure, the metal wire grids 12 may be formed at a surface of the base substrate 11 where the binding areas 14 and the binding contraposition areas 15 are arranged, and then the metal wire grids 12 are photoetched to remove some segments of the metal wire grids 12, so that orthographic projections of the remaining metal wire grids 12 on the base substrate 11 do not overlap with the binding areas 14 and the binding contraposition areas 15, to avoid the metal wire grid 12 from shielding the light in the subsequent binding process, enable the alignment process to proceed smoothly and realize the binding accuracy.

In this exemplary embodiment, light is provided to emit from a side of the base substrate 11 opposite to the binding areas 14 and the binding contraposition areas 15.

In addition, after the metal wire grids 12 is formed at the side of the base substrate 11 opposite to the binding areas 14 and the binding contraposition areas 15, the manufacturing method of the metal wire grid polarizer described above may further include: forming a material shielding layer at a side of the base substrate facing away from the metal wire grids 12, and then the material shielding layer is patterned to form a first shielding portion 18 and a second shielding portion 19. The first shielding portion 18 and the second shielding portion 19 are both provided in a ring shape. The first shielding portion 18 and the second shielding portion 19 are both located at the light exit side of the metal wire grid 12, and the light is emitted into the metal wire grids 12, polarized by the metal wire grids 12, and then enters the base substrate 11, and passes through the base substrate 11 to the first shielding portion 18 and the second shielding portion 19.

The edges of the binding area 14 lie in an orthographic projection of the first shielding portion 18 on the base substrate 11, the edges of the binding contraposition area 15 lie in an orthographic projection of the second shielding portion 19 on the base substrate 11, the edges of the binding area 14 may lie in a middle position in a width direction of the orthographic projection of the first shielding portion 18 on the base substrate 11, and the edges of the binding contraposition area 15 may lie in a middle position in a width direction of the orthographic projection of the second shielding portion 19 on the base substrate 11. The width of the first shielding portion 18 or the second shielding portion 19 is about 5 microns. The uneven light caused by the abnormality of the metal wire grid 12 can be avoided by shielding the abnormality caused by respectively removing the metal wire grids 12 at the edges of the binding area 14 and the binding contraposition area 15 by the first shielding portion 18 and the second shielding portion 19 that causes abnormal shielding. In addition, the first shielding portion 18 and the second shielding portion 19, and the metal wire grid 12 are arranged at both sides (opposite sides) of the base substrate 11 in the structure described above. Therefore, the first shielding portion 18 and the second shielding portion 19 may be firstly formed, and then the metal wire grids 12 may be formed.

It should be noted that when the metal wire grids 12 are formed at a side of the base substrate 11 where the binding areas 14 and the binding contraposition areas 15 are arranged, the first shielding portion 18 and the second shielding portion 19 may be formed at a side of the metal wire grids 12 facing away from the base substrate 11, at this time, it is required that the metal wire grids 12 are firstly formed, and then the first shielding portion 18 and the second shielding portion 19 are formed. When the metal wire grids 12 are formed at a side of the base substrate 11 opposite to the binding areas 14 and the binding contraposition areas 15, the first shielding portion 18 and the second shielding portion 19 may be formed between the metal wire grids 12 and the base substrate 11, and it is necessary to form the first shielding portion 18 and the second shielding portion 19 before forming the metal wire grids 12. In this way, it can be ensured that the first shielding portion 18 and the second shielding portion 19 are located at a light exit side of the metal wire grid 12.

Figure 10:
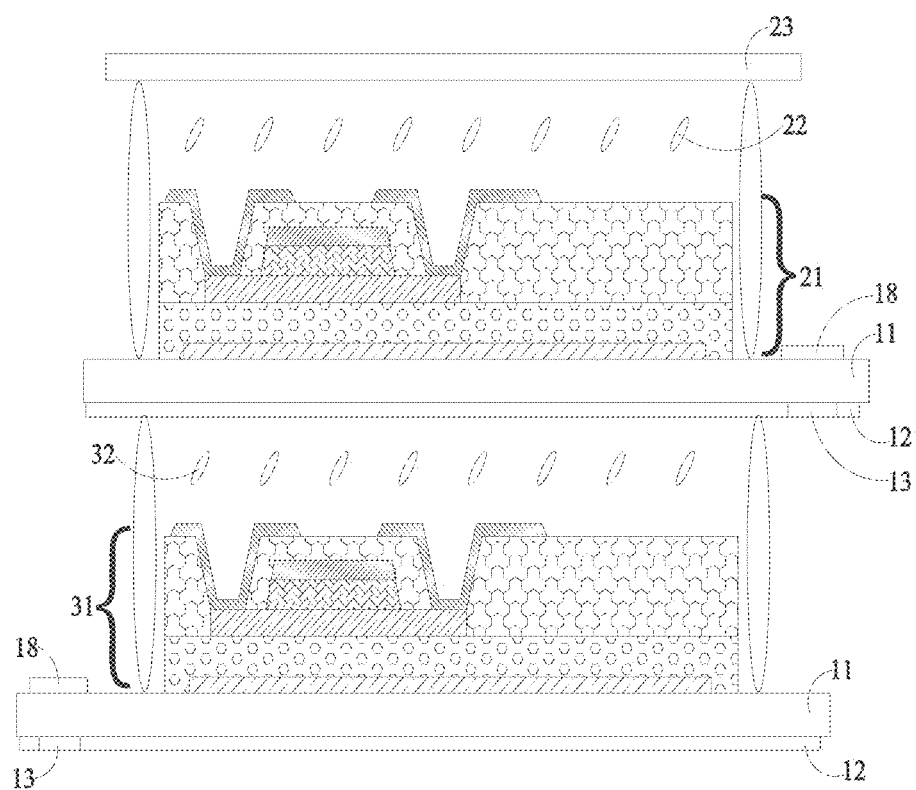
FIG. 10 is a structural view of an exemplary embodiment of a display device according to the present disclosure.

Further, the present disclosure also provides a display device. Referring to a schematic structural view of an exemplary embodiment of the display device of the present disclosure shown in FIG. 10, the display device may include a display panel 2 and an optical control panel 3. The display panel 2 is located at a light exit side of the optical control panel 3, specifically, the display panel 2 is located at a side of a second liquid crystal layer 32 facing away from a second array substrate 31, and a first liquid crystal layer 22 of the display panel 2 is farther away from the optical control panel 3 than a first array substrate 21.

The display panel 2 includes the metal wire grid polarizer 1 described above. The structure of the metal wire grid polarizer 1 has been described in detail, and will not be repeated herein.

In this exemplary embodiment, the display panel 2 may further include a first array substrate 21, a first liquid crystal layer 22 and a color film substrate 23. The first array substrate 21 may be disposed at a side of the base substrate 11 facing away from the metal wire grids 12, that is, the first array substrate 21 and the metal wire grids 12 are disposed at both sides (opposite sides) of the base substrate 11. The first liquid crystal layer 22 is disposed at a side of the first array substrate 21 facing away from the base substrate 11. The color film substrate 23 is disposed at a side of the first liquid crystal layer 22 facing away from the array substrate.

Of course, in other exemplary embodiments of the present disclosure, the first array substrate 21 may be disposed at a side of the metal wire grids 12 facing away from the base substrate 11, that is, the metal wire grids 12 are disposed between the base substrate 11 and the first array substrate 21. An insulating layer may also be provided between the metal wire grids 12 and the first array substrate 21.

The optical control panel 3 includes the metal wire grid polarizer 1 described above. The structure of the metal wire grid polarizer 1 has been described in detail, and will not be repeated herein.

In this exemplary embodiment, the optical control panel 3 may further include a second array substrate 31 and a second liquid crystal layer 32. The second array substrate 31 may be disposed at a side of base substrate 11 facing away from the metal wire grids 12, that is, the second array substrate 31 and the metal wire grids 12 are disposed at both sides (opposite sides) of base substrate 11. The second liquid crystal layer 32 is disposed at a side of the second array substrate 31 facing away from the base substrate 11.

Of course, in other exemplary embodiments of the present disclosure, the second array substrate 31 may be disposed at a side of the metal wire grids 12 facing away from the base substrate 11, that is, the metal wire grids 12 are disposed between the base substrate 11 and the second array substrate 31. An insulating layer may also be provided between the metal wire grids 12 and the second array substrate 31.

Other embodiments of the disclosure will be apparent to those skilled in the art from consideration of the specification and practice of the disclosure disclosed herein. This application is intended to cover any variations, uses, or adaptations of the disclosure following, in general, the principles of the disclosure and including such departures from the present disclosure as come within known or customary practice in the art to which the disclosure pertains. It is intended that the specification and examples be considered as exemplary only, with a true scope and spirit of the disclosure being indicated by the following claims.

What is claimed is:

1. A metal wire grid polarizer comprising:
   a base substrate having binding areas and binding contraposition areas;
   metal wire grids disposed on the base substrate and arranged parallel to each other, orthographic projections of the metal wire grids on the base substrate do not overlap with the binding areas or the binding contraposition areas,
   wherein the metal wire grid, the orthographic projection of which extending to the binding area and the binding contraposition area, comprises at least two sub-metal wire grids spaced apart, and the metal wire grid polarizer further comprises:
   transparent wire grids disposed on a same surface of the base substrate with the metal wire grids, and arranged parallel to the metal wire grids, two ends of at least one of the transparent wire grids being respectively connected to two of the sub-metal wire grids on a same straight line.

2. A metal wire grid polarizer comprising:
   a base substrate having binding areas and binding contraposition areas;
   metal wire grids disposed on the base substrate and arranged parallel to each other, orthographic projections of the metal wire grids on the base substrate do not overlap with the binding areas or the binding contraposition areas,
   wherein the metal wire grid, the orthographic projection of which extending to the binding area and the binding contraposition area, comprises at least two sub-metal wire grids spaced apart, and the metal wire grid polarizer further comprises:
   transparent wire grids disposed on a same surface of the base substrate with the metal wire grids, and arranged parallel to the metal wire grids, two ends of at least one of the transparent wire grids being respectively connected to two of the sub-metal wire grids on a same straight line,
   wherein the metal wire grid polarizer further comprises:
   first shielding portions at a light exit side of the metal wire grid, an edge of the binding area being within an orthographic projection of the first shielding portion on the base substrate;
   second shielding portions at the light exit side of the metal wire grid, and an edge of the binding contraposition area being within an orthographic projection of the second shielding portion on the base substrate.

3. The metal wire grid polarizer of claim 1, wherein the metal wire grid is an aluminum wire grid, and the transparent wire grid is a transparent resin wire grid.

4. A display device, comprising:
   a display panel comprising the metal wire grid polarizer of claim 1;
   an optical control panel comprising the metal wire grid polarizer of claim 1;
   the display panel being at a light exit side of the optical control panel.

5. The display device of claim 4, wherein the display panel further comprises:
   a first array substrate at a side of the base substrate facing away from the metal wire grids, or a side of the metal wire grids facing away from the base substrate;
   a first liquid crystal layer at a side of the first array substrate facing away from the base substrate;
   a color film substrate at a side of the first liquid crystal layer facing away from the array substrate.

6. The display device of claim 4, wherein the optical control panel further comprises:
a second array substrate at a side of the base substrate facing away from the metal wire grids or a side of the metal wire grids facing away from the base substrate;
a second liquid crystal layer at a side of the second array substrate facing away from the base substrate.

7. The display device of claim 4, wherein binding areas and binding contraposition areas of the display panel, and binding areas and binding contraposition areas of the optical control panel are located at opposite sides of the display device.

\* \* \* \* \*